US012388667B2

(12) United States Patent
Gordon

(10) Patent No.: US 12,388,667 B2
(45) Date of Patent: Aug. 12, 2025

(54) SYSTEM AND METHOD WITH CRYPTOGRAPHY FOR TRANSFERRING RECORDATION AND MANAGEMENT AUTHORITY OVER A REAL PROPERTY TITLE TO A BLOCKCHAIN LEDGER

(71) Applicant: Roger Norris Gordon, Washington, DC (US)

(72) Inventor: Roger Norris Gordon, Washington, DC (US)

( * ) Notice: Subject to any disclaimer, the term of this patent is extended or adjusted under 35 U.S.C. 154(b) by 0 days.

(21) Appl. No.: 18/779,021

(22) Filed: Jul. 21, 2024

(65) Prior Publication Data

US 2024/0388457 A1    Nov. 21, 2024

Related U.S. Application Data

(63) Continuation-in-part of application No. 17/494,691, filed on Oct. 5, 2021, which is a continuation-in-part of application No. 16/430,406, filed on Jun. 3, 2019, now abandoned.

(60) Provisional application No. 62/679,313, filed on Jun. 1, 2018.

(51) Int. Cl.
*H04L 29/06* (2006.01)
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0825* (2013.01); *H04L 9/3236* (2013.01); *H04L 9/3247* (2013.01)

(58) Field of Classification Search
None
See application file for complete search history.

(56) References Cited

U.S. PATENT DOCUMENTS 10,878,522 B2 * 12/2020 Blackman ............. H04L 9/3239
11,501,365 B1 * 11/2022 Awasthy ................. H04L 63/04
12,126,875 B1 * 10/2024 Crow ................. H04N 21/2393
(Continued)

OTHER PUBLICATIONS

Consumer Financial Protection Bureau; "Managing Someone Else's Money," Help for Trustees Under a Revocable Living Trust; Apr. 2015; 28 pages.

*Primary Examiner* — Eleni A Shiferaw
*Assistant Examiner* — Hassan A Hussein
(74) *Attorney, Agent, or Firm* — Doster Greene, LLC

(57) ABSTRACT

Various methods, apparatuses, systems, and media for creating and maintaining a distributed ledger or blockchain registry are disclosed. A memory is operable to store a blockchain, and a processor is operably coupled to the memory. The processor receives data representative of a property title from a traditional ledger, wherein the data representative of the property title is processed with a hash function to obtain a hash value. The processor creates a blockchain transaction by using the hash value of the data representative of the property title from the traditional ledger to the blockchain ledger. The processor executes a smart contract in the blockchain transaction to define one or more terms of transferring the property title to the blockchain ledger. The processor stores the smart contract in the blockchain transaction on the blockchain ledger, wherein the blockchain ledger comprising a plurality of blockchain transactions.

20 Claims, 3 Drawing Sheets

(56) References Cited

U.S. PATENT DOCUMENTS

| | | | | |
|---|---|---|---|---|
| 12,131,214 | B2* | 10/2024 | Rodriguez | H04L 9/0822 |
| 12,132,842 | B2* | 10/2024 | Kumar | H04L 9/3247 |
| 12,132,846 | B2* | 10/2024 | Kumar | H04L 9/321 |
| 2007/0198401 | A1* | 8/2007 | Kunz | G06Q 40/00 |
| | | | | 705/38 |
| 2016/0300234 | A1* | 10/2016 | Moss-Pultz | H04L 9/3247 |
| 2016/0350728 | A1* | 12/2016 | Melika | G06Q 20/3829 |
| 2017/0331896 | A1* | 11/2017 | Holloway | H04L 67/04 |
| 2018/0019993 | A1* | 1/2018 | Kravitz | G06F 21/64 |
| 2018/0075028 | A1* | 3/2018 | Ruschin | G06F 21/64 |
| 2019/0080392 | A1* | 3/2019 | Youb | G06Q 20/065 |
| 2019/0147553 | A1* | 5/2019 | Reber | G06Q 20/389 |
| | | | | 705/65 |
| 2019/0287195 | A1* | 9/2019 | Lee | G06Q 40/04 |
| 2020/0175623 | A1* | 6/2020 | Howie | G06Q 50/18 |
| 2020/0193538 | A1* | 6/2020 | Kameta | H04L 9/0643 |
| 2020/0234386 | A1* | 7/2020 | Blackman | H04L 9/30 |
| 2020/0272619 | A1* | 8/2020 | Alferov | H04L 9/3239 |
| 2024/0170113 | A1* | 5/2024 | Schneider | G06F 21/64 |
| 2024/0281796 | A1* | 8/2024 | Finlow-Bates | G06Q 20/405 |
| 2024/0354760 | A1* | 10/2024 | Tsai | G06Q 20/401 |
| 2024/0362602 | A1* | 10/2024 | Marshall | G06Q 20/3678 |
| 2024/0365116 | A1* | 10/2024 | Lake | H04W 12/35 |
| 2024/0365118 | A1* | 10/2024 | Nainar | H04M 3/42034 |

* cited by examiner

SYSTEM AND METHOD WITH CRYPTOGRAPHY FOR TRANSFERRING RECORDATION AND MANAGEMENT AUTHORITY OVER A REAL PROPERTY TITLE TO A BLOCKCHAIN LEDGER

CROSS-REFERENCE TO RELATED APPLICATIONS

This application is a Continuation-In-Part of U.S. patent application Ser. No. 17/494,691, filed Oct. 5, 2021, which is a Continuation-In-Part of U.S. patent application Ser. No. 16/430,406, filed Jun. 3, 2019, now pending, which claims benefit to U.S. Provisional Patent Application No. 62/679,313, filed Jun. 1, 2018, all of which are hereby incorporated by reference.

FIELD OF INVENTION

The present disclosure relates generally to a computerized systems and methods for verifying provenance and controlling the conveyance of assets recorded across different types of ledger platforms, and more particularly to a computerized systems and methods that enables property titles, which are recorded in traditional ledgers that are maintained by recorders of deeds, to be transferred onto a blockchain ledger.

BACKGROUND

In the United States and much of the world, interests in real property, such as fee simple ownership, liens, and covenants are enforceable only after they have been recorded in an official government ledger. As such, the property recording system is one of the most important public records systems. Although most counties have adopted electronic recording systems, these systems usually merely reproduce paper systems and procedures electronically.

Conventional property recording systems, as shown as prior art illustrated in FIG. 1, have not been meaningfully updated for hundreds of years. Under the current recording system, title records are often lost, misfiled, incomplete, contradictory, or unreadable. Industry experts estimate that approximately 30% of titles are defective at the time a transaction, such as a sale or mortgage, is undertaken. As a result, property owners, buyers, and lenders must expend significant resources to search for, cure, and insure against defects. The current recording system is also highly fragmented, with each of the over 3,000 counties in the United States maintaining its own title records. Recording requirements vary widely, as do fees and processing times, which makes it more expensive for lenders, insurers, and investors to work across jurisdictions. This results in higher costs for property owners. FIG. 1 illustrates the prior art. FIG. 1 illustrates how to record an agreement with a traditional recorder 100 that maintains public records and documents. To record a legal agreement with the traditional recorder 100, the document needs to meet all necessary requirements. As shown in FIG. 1, the traditional recorder 100 maintains the prior recorded agreements 102 as title documents, which are formal documents that establish ownership of a property or asset. Any newly executed agreement 104 presented for recording must pass, in this example, a three-part test 106 by proving that it bears authentic signatures that were intentionally applied to a written agreement. When the newly executed agreement 104 presented for recording passes the three-part test 106, then it is added to the traditional recorder 100 as an agreement 108 that becomes an enforceable title document.

To avoid the requirements of the conventional property recording system, in 1995, the mortgage banking industry formed Mortgage Electronic Registration Systems, Inc®. (MERS®) MERS® is a privately owned database created to simplify registering and transferring mortgages. An assignment is prepared and recorded in the county land records each time a mortgage is sold from one bank to another. The assignment is a document showing that the mortgage has been transferred.

By naming MERS® as their nominee in recorded mortgages, lenders can trade their mortgages freely on their own private ledger without having to record them with county recorders each time. MERS® is not a replacement for the public recordation of the original mortgage (promissory note and security interest) but it does allow MERS's® numerous members to avoid re-recording costs and to enjoy greater liquidity, transferability, security, and profits. While MERS® can save time and recording costs, it has drawn criticism for making it difficult to determine who actually is the current owner of a mortgage.

Thus, there is a need for a systems and method that enables a covenant to be recorded against a real property that provides notice to prospective interest holders that only agreements recorded on the blockchain and signed with the blockchain recorder's private key may create a new interest or modify, alienate, or extinguished a prior interest, including any recorded on a paper ledger. Furthermore, there is a need for a system and method that transforms ownership of real property into digital form thereby making real property a safer, more efficient, and more flexible asset class.

SUMMARY OF THE INVENTION

The present invention may satisfy one or more of the above-mentioned desirable aspects. Other features and/or aspects may become apparent from the description that follows. The systems, methods and devices of the disclosure all have innovative aspects, no single one of which is indispensable or solely responsible for the desirable attributes disclosed herein. Without limiting the scope of the claims, some of the advantageous features will now be summarized.

According to various embodiments, systems and methods are provided that enable a covenant to be recorded against a real property which provide notice to prospective interest holders that only agreements recorded on the blockchain and signed with the blockchain recorder's private key may create a new interest or modify, alienate, or extinguished a prior interest, including any recorded on a paper ledger.

According to various embodiments, a tool is provided that traces and verifies the data governance of the recorded covenant associated with an asset, such as a real property, transferred from a traditional ledger and recorded and maintained on a blockchain ledger that controls subsequent conveyance of the asset.

Furthermore, in various embodiments, a system and method is provided that transforms ownership of real property into digital form thereby making real property a safer, more efficient, and more flexible asset class.

In other exemplary embodiments, a method for creating and maintaining a distributed ledger or blockchain registry by utilizing one or more processors and one or more memories can include receiving a property title from a traditional ledger using a computer interface; creating a blockchain transaction by transferring the property title from the traditional ledger to a blockchain ledger; storing a smart contract in the blockchain transaction to stipulate one or more terms of transferring the property title to the blockchain ledger; and storing the blockchain transaction on the blockchain ledger.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

Figure 1:
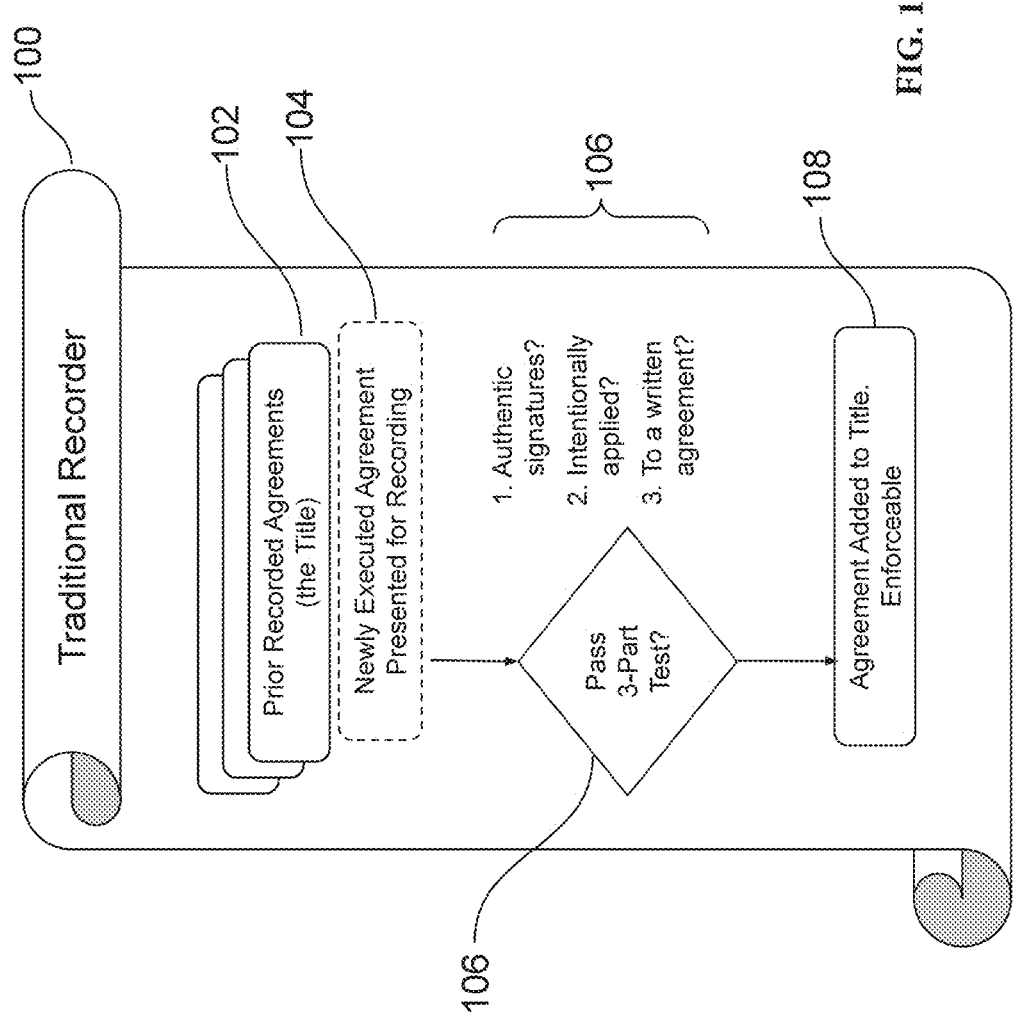
FIG. 1 is a prior art representation for recording a property title in a traditional recorder.

The skilled artisan will understand that the drawings described below are for illustrative purposes only. The drawings are not intended to limit the scope of the present teachings in any way.

DETAILED DESCRIPTION OF THE EMBODIMENT(S)

The present disclosure relates generally to a computerized systems and methods for verifying provenance and controlling the conveyance of assets recorded across different types of ledger platforms. Certain aspects of the present disclosure relate to a computerized systems and methods that enables property titles, which are recorded in traditional ledgers that are maintained by recorders of deeds, to be transferred onto a blockchain ledger and for future transactions recorded only on the blockchain ledger to be enforceable.

The present technology is very useful and innovative as it allows transforming ownership of real property into digital form thereby making real property a safer, more efficient, and more flexible asset class.

Another useful and innovative aspect with respect to the present technology relates to one or more methods for conveying a property title to a blockchain ledger and recording an enforceable agreement on the blockchain ledger. Furthermore, the method verifies the enforceability of the blockchain-recorded agreement.

Some aspects of the present disclosure relate to the creation of a legally enforceable blockchain ledger. In various embodiments, the systems and methods allows a property owner to unilaterally transfer management of their property title away from a government ledger and onto a superior and legally enforceable private ledger. This addresses some of the disadvantages associated with conventional recorders of deeds that are monopolists who do not compete to provide better efficiency, accuracy, or authenticity.

The present disclosure of the systems and methods allows the transfer of a property title to be authenticated faster and less expensively than if a traditionally signed transfer instrument were used and by using only information from the traditional ledger. The present disclosure employs a cryptographic technique so that the transferring covenant cannot be easily challenged or repudiated as a forgery.

In various embodiments, the present disclosure allows a blockchain ledger to be associated with a paper ledger with the same level of authenticity and non-reputability that exists within the blockchain itself, essentially making the paper ledger the zero block in the blockchain.

Aspects of the present disclosure relate to the creation of a marketplace of ledgers. In various embodiments, the systems and methods allow a master ledger manager to authorize subordinate ledger managers who can compete to provide specialized ledger management services, such as those tailored to older property owners. Just as computer users can choose the operating system that best meets their needs, property owners can choose the ledger manager that best meets their needs. Because the ledger manager is a contracted agent of the property owner, not a public official, the ledger manager can be held accountable by the property owner to a fiduciary standard of care.

According to the present systems and methods, the credibility of the ledger is driven not by its official status but by its truthfulness (how faithfully it describes the facts it purports to), its accuracy (maintenance and accessibility), and its authenticity (absence of tampering). It is also driven by the rate of error (the difference between what the parties signed and what they believed they were signing) of transactions on the ledger. The present systems and methods provide a security framework that continuously monitors and validates that a user and their electronic devices have the right privileges and attributes. Examples of electronic devices include personal computers, cell phones, handheld messaging devices, laptop computers, tablet computers, set-top boxes, personal data assistants, embedded computer systems, electronic book readers, and the like. The systems and methods also require enforcement of policy that incorporates risk of the user and electronic device, along with compliance or other requirements to consider prior to permitting the transaction to be added to the blockchain ledger. The security framework provided by the present disclosure is similar to the Zero Trust cybersecurity approach.

The present systems and methods enables county recorders to convert to blockchain recording using the same security standard. Various embodiments provide recorders of deeds with a single method by which to convert their property title records to a blockchain title system either on their own individual internal blockchain ledgers or on one or more external ledgers. According to the present disclosure, the security framework requires all users to be authenticated and authorized and the terms of the transactions verified before granting access to the blockchain ledger whether on an internal or external ledger. Using the security framework of the present disclosure, third parties, such as lenders, insurers, and investors, can interact with either an internal or external ledger at a lower cost and with a higher level of confidence.

The systems and methods allow one or more processors to receive from a user, such as a property owner, a request for unilaterally transferring management of a property title away from a government ledger and onto a superior and legally enforceable private ledger, such as a blockchain ledger. The systems and methods then allows the user to enter into a contract with a blockchain ledger manager that functions as an enforcement agent to verify compliance of a transaction with predetermined rules and terms before adding the transaction to a blockchain ledger. In some embodiments, the user and the enforcement agent may sign the contract using an electronic agreement or a smart contract system.

According to various embodiments, one or more steps described herein may be implemented by a human user, a non-human user, or through the interaction of a combination thereof. For example, the systems and methods may allow a human operator to define the terms of the contract agreement. Other embodiments may automate one or more steps in the process. For example, in some embodiments, one or more of the steps performed by the blockchain ledger manager may be automated. As an example, another computer program, software application, artificial intelligence (AI) or a machine learning algorithm may automatically perform one or more steps described herein.

In various embodiments, once the property title is transferred to the blockchain ledger, the human operator using the computer or the computer, autonomously or upon request, may function as the blockchain ledger manager. The systems and methods then enable the blockchain ledger manager to provide instructions to the one or more processors to create cryptographically signed covenants and digital certificates that authenticate ownership, monitor future transactions of the property, prevent transfer of the property title, and/or authorize transfer of the property title, as governed by the cryptographically signed covenants and digital certificates. When a subsequent transaction is proposed that involves a transfer, creation, or extinguishment of an interest in the property recorded on the blockchain ledger, the systems and methods may require the property owner and all parties to the transaction to apply to the blockchain ledger manager to have the transaction approved for recording on the blockchain ledger before the transaction is executed. Once the transaction has been approved, the blockchain ledger manager may add the executed transaction and any digital certificates to the property's title on the blockchain ledger. Then, future owners and interest holders of the property may depend upon the recorded transaction and the cryptographically signed certificates to prove enforceable interests.

The term "transfer," as used herein, refers not only to a change in ownership of a property but also to the creation of any interest in a property in any party other than its current owner. The term "transfer" may include, for example, the creation of a security interest in a mortgagee by a mortgage agreement and the creation of a future interest in a beneficiary by a property owner's will. The term "transfer" is used for the sake of brevity and should not be interpreted as limiting the application of the disclosed invention.

The term "interests," as used herein, refers to legal rights concerning real property. The legal rights may include, for example: ownership interests, such as fee simple ownership; possessory interests, such as long-term leases; and security interests, such as when a property has been pledged as collateral.

The term "agreement" or "contract," as used herein, refers to any written document signed by a property owner that would extinguish or modify its interest in its property or create an interest in its property in another party.

In the following detailed description, numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 2:
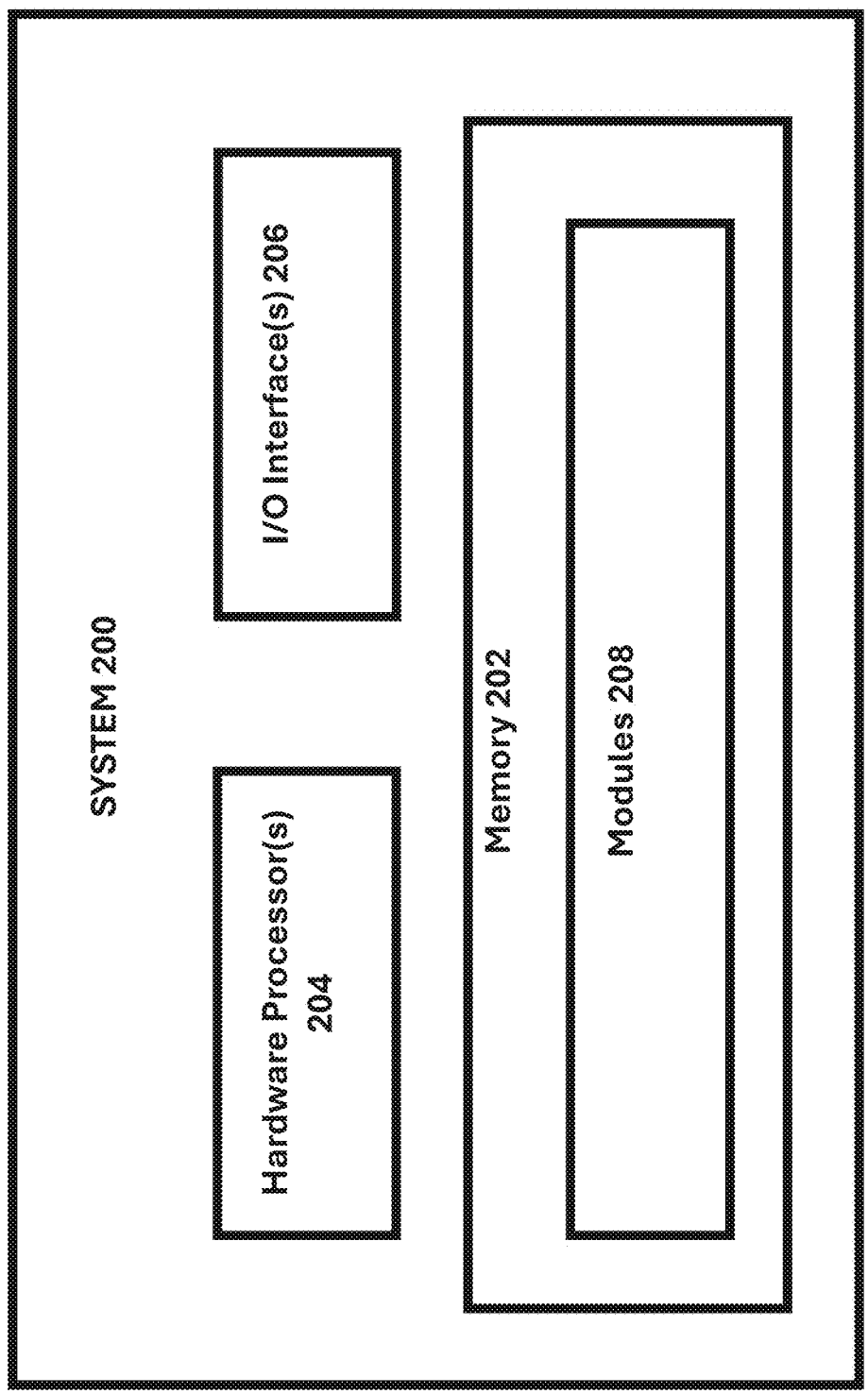
FIG. 2 illustrates a functional block diagram of a system for creating and maintaining a distributed ledger or blockchain registry using a blockchain network, in accordance with some embodiments of the present disclosure.

FIG. 2 illustrates a block diagram of a system (200) for creating and maintaining a distributed ledger or blockchain registry using a blockchain network in accordance with an example embodiment. In an embodiment, the system 200 includes processor(s) 204, communication interface device(s), alternatively referred as or I/O interface(s) 206, and one or more data storage devices or memory 202 operatively coupled to the processor(s) 204. The processor(s) 204 may be alternatively referred as one or more hardware processors or simply processor (204). In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 204 is configured to fetch and execute computer-readable instructions stored in the memory. The system 200 can be implemented in a variety of computing systems, such as laptop computers, notebooks, hand-held devices, workstations, mainframe computers, servers, a network cloud and the like.

The I/O interface(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for receiving the input request. The input request is obtained from any external source configured to any blockchain network.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 202 may comprise a plurality of configurable modules 208. The memory 202 may further comprise information pertaining to input(s)/output(s) of each step performed by the system 200 and methods of the present disclosure. Functions of the components of system 200 are explained in conjunction with method steps of flow diagrams depicted in FIG. 3 and use case examples. The system 200 can be implemented in any blockchain network for creating and maintaining a distributed ledger or blockchain registry.

Figure 3:
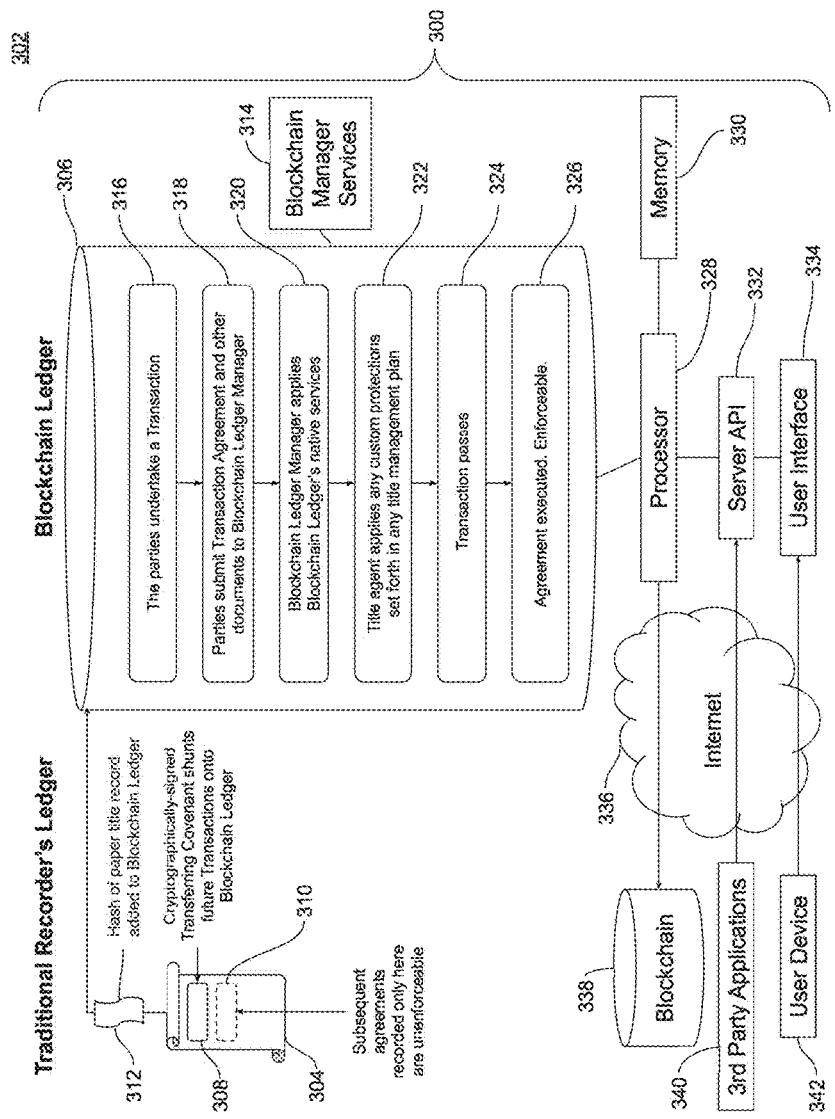
FIG. 3 illustrates a computing system for transferring property titles that are recorded in traditional ledgers onto a blockchain ledger for future transactions in accordance with aspects of the present disclosure.

FIG. 3 depicts an exemplary environment 302 of a system 300 for creating and/or maintaining a distributed ledger or blockchain registry according to the present teaching. Although FIG. 3 depicts certain entities, components, and devices, it should be appreciated that additional or alternate components are envisioned.

As illustrated in FIG. 3, the environment 302 may include at least two ledgers-a traditional recorder's ledger 304 (referred to hereafter as "traditional ledger") and a blockchain ledger 306. To allow property titles to be more efficiently managed and traded, environment 302 allows property titles to be transferred away from traditional ledgers 304 maintained by recorders of deeds and onto a more secure, efficient, and powerful blockchain ledger 306.

The traditional ledger 304 is commonly known as a register of deeds, which refers to records of real estate deeds or other interests in lands maintained by a local government official at the town, county, or state level. While a title and deed both prove ownership of a piece of property, they are different. Titles are legal concepts that outline ownership.

Deeds are physical, legal documents that prove ownership of an asset, such as a home, land, or another piece of property. The deed holder, who is listed on the document, is granted certain rights to the piece of property in question. Deeds serve a number of purposes. For instance, a property owner needs a deed in order to transfer the title or sell the asset to someone else. Deeds and other agreements creating interests in property must be signed, witnessed, notarized, and filed with the municipality or county. These rules ensure that authentic signatures were intentionally applied to written agreements. Once these requirements are met, the agreements must be accepted for recording by the keeper or manager of the register of deeds, i.e., the recorder of deeds, on the traditional ledger 304, and become public and enforceable. In some jurisdictions, the functions of recorders of deeds are performed by "county clerks," "court clerks," or some other local official. Recorders' Offices are sometimes referred to as "Land Records" offices or something similar. In all cases, they are government officials and public entities.

Thus, the traditional ledger 304 provides a single, centralized location in which records of real property rights are recorded and may be researched by interested parties. In general, the register may be used in conjunction with a grantor-grantee index that lists the owner of record and any creation, extinguishment, or transfers of any interests in the property. The traditional ledger 304 can be used when individuals or companies need to gather information about a property's history.

Traditional ledger 304 is available for public viewing. However, one of the disadvantages associated with a traditional ledger 304 is that it generally requires some time and government assistance to access particular mortgage records or deeds.

As shown in FIG. 3, environment 302 allows property titles to be transferred away from traditional ledgers 304 maintained by recorders of deeds and onto a more secure, efficient, and powerful blockchain ledger 306. A property owner can enter into an agreement with a blockchain ledger manager that gives the blockchain ledger manager the sole right to record transactions involving the owner's property on the traditional ledger 304 or on any other ledger. This requirement is enforced through a recorded covenant in which the property owner stipulates that future agreements concerning its property must be signed by the blockchain ledger manager. In various embodiments, a human operator using a computer or the computer, autonomously or upon request, may function as the blockchain ledger manager, which enforces the terms and conditions stipulated by the property owner when it transferred management of its title onto the blockchain ledger.

Then, a cryptographically signed recorded covenant 308 can be added to the traditional ledger 304 to put prospective interest holders on notice that the property owner has stipulated that while the property owner owns the property all future interests must be created by agreements accepted for recording by the blockchain ledger manager and recorded on a specified blockchain ledger.

The recorded covenant may state that any subsequent transaction or agreement must be signed with the blockchain ledger manager's cryptographic signature, which is generated using its private key through usage of a public-private key cryptography. Public-key cryptography uses a pair of mathematically related cryptographic keys, referred to as the "private key" (or "secret key") and the "public key." The private key is intended to be associated uniquely with one user and kept secret. The public key may be freely distributed and known to anyone.

Public-key cryptography, according to the present disclosure, can be used to provide confidentiality, verification, authenticity, and non-repudiation. The public-key encryption may be used to send information confidentially. For example, a sender may encrypt a message with the recipient's public key, which can only be decrypted by the recipient's paired private key.

Another application of the public-key cryptography according to the present disclosure is verification and authentication using digital certificates and digital signatures. Herein, the term "digital certificates" refers to a signed electronic document that notarizes and binds the connection between a public key and its legitimate owner to prove the owner's identity. Its purpose is to prevent unauthorized impersonation and provide confidence in the public keys. The term "digital signature" refers to an electronic identification of a person or thing created by using a public-key algorithm, intended to verify to a recipient the integrity of the data and the identity of the sender of the data. Further application of the public-key cryptography according to the present disclosure is non-repudiation that uses digital signature to ensure that one party cannot successfully dispute authorship of a document or communication.

The blockchain ledger manager as the enforcement agent can provide instructions to the one or more processors to create cryptographically signed covenants and digital certificates that authenticate ownership, monitor future transactions of the property, prevent transfer of the title, and authorize transfer of the title, as governed by the cryptographically signed covenants and digital certificates.

The covenant 308 is signed, notarized, and recorded with the recorder of deeds in the traditional manner and includes the cryptographic signature of the blockchain ledger manager. From then on, only transactions signed by the blockchain ledger manager can be enforced against the title. As a result, any subsequent agreement 310 recorded solely on the traditional ledger 304 is unenforceable. Thus, the cryptographically signed transferring covenant 308 recorded on the traditional ledger 304 shunts future transactions onto the blockchain ledger 306.

One purpose of signing the covenant 308 cryptographically is to require a party who desires to acquire an interest in a property on the blockchain ledger to authenticate the cryptographic signature of the blockchain ledger manager on all agreements signed by the property owner after the title was transferred to the blockchain ledger. This requirement, if ignored, prevents parties who claim to have purchased interests from third parties who allegedly acquired them from property owners through off-blockchain ledger transactions from raising bona fide purchaser or holder in due course defenses against the property owner's or blockchain ledger manager's efforts to repudiate those off-ledger interests.

A bona fide purchaser, by traditional definition, is a party that pays valuable consideration for a property, has no notice of any outstanding claims of other parties, and acts in good faith. A holder in due course, by traditional definition, is one who takes a negotiable instrument, such as a check or promissory note, for value, in good faith, and without notice of any claim or defense against it or without notice that the instrument contains an unauthorized signature or has been altered. Bona fide purchasers and holders in due course, in traditional transactions, can enforce their interests even against claims by prior property owners who lost their interests after being fraudulently induced to sign harmful agreements.

Prospective interest holders have constructive notice of the recorded transferring covenant 308 and its requirement that future agreements be recorded on the blockchain ledger 306 and bear the blockchain ledger manager's cryptographic signature. A cryptographic signature must be authenticated before it may be relied upon and cannot be forged. Therefore, according to the present disclosure, because it is not possible for claimants to future interests to have relied upon inauthentic signatures in good faith, it is not possible for them to raise bona fide purchaser or holder in due course defenses against owners who allegedly lost their interests through off-blockchain ledger transactions.

For the sake of completeness, the blockchain ledger manager creates a hash 312 of the entire existing title record existing on the traditional ledger 304, signs it with its private key, and adds it to the blockchain ledger 306. Now, the entire property title record—with the exception of interests created through processes that do not require a property owner's signature, such as mechanic's liens, judgments, and court orders—is contained on the blockchain ledger 306. In some embodiments, the blockchain ledger 306 may need to be regularly annotated with any such entries made on the traditional ledger 304 in order to contain the complete title record.

In various embodiments, the blockchain ledger manager can create the cryptographic hash of key terms from the approved agreement and the recorded covenant using a secure hash algorithm such as SHA1. The blockchain ledger manager can then sign the hash with its cryptographic signature using its private key. This method can be applied to paper documents using image capture and Optical Character Recognition (OCR) or other digital representations of the key terms—for example, but not limited to, QR codes—that can represent the hashes or the inputs to be hashed and subsequently compared to the decrypted signed-hash. See, for example, *A Model for Embedding and Authorizing Digital Signatures in Printed Documents*, by Lee, Kwon, et al in Korea Information Security Agency, ICISC (2002), which is incorporated herein by reference.

According to various exemplary embodiments, the systems and methods enables a covenant to be recorded against a real property to provide notice to prospective interest holders that only agreements recorded by the blockchain ledger manager on the blockchain ledger 306 and signed with the blockchain ledger manager's private key may create a new interest or modify, alienate, or extinguished an existing interest, including any recorded on the traditional ledger 304. The covenant bears the blockchain ledger manager's cryptographic public key and expressly repudiates future agreements recorded solely on the traditional ledger 304 unless they are signed with the blockchain ledger manager's private key. Including the blockchain ledger manager's cryptographic public key on the transferring covenant recorded on the traditional ledger allows transactions recorded on the blockchain ledger 306 to be authenticated back through the chain of title to the traditional ledger 304, thereby making them enforceable. Although the government ledger maintained by the recorder of deeds remains the source of legal control over the title, the last transaction signed by the property owner and recorded on the traditional ledger directs the courts to look to the blockchain ledger for authorized future transactions affecting the title. Although the blockchain ledger manager is available to testify as to the accuracy of the blockchain ledger in its capacity as the blockchain ledger's custodian of records, in practice such testimony would not be necessary because it is a relatively simple matter for third parties to verify the authenticity of records on a blockchain ledger.

Once the covenant that transfers recording authority to the blockchain ledger manager has been recorded on the traditional ledger, any subsequent agreement 310 recorded on the traditional ledger 304 without the blockchain ledger manager's cryptographic signature is unenforceable. Thus, the cryptographically signed transferring covenant 308 recorded on the traditional ledger 304 shunts recording authority and all future transactions onto the blockchain ledger 306.

Once the blockchain ledger manager creates the hash 312 of the title record existing on the traditional ledger 304 and signs the hash 312 of the title record with its private key, the cryptographically signed hash 312 of the title record and the title record itself are incorporated into the blockchain ledger 306. The blockchain ledger 306 is included in a computer-implemented blockchain ledger computer system 300 (also referred to herein as a computing system 300 or a system 300). Computing system 300 interfaces with the traditional ledger 304 and the blockchain 338 according to certain example embodiments. Computing system 300 may include a combination of software and hardware interfaces, programmed business logic, processing resources, and electronically addressable storage. Computing system 300 is responsible for tracking and executing computer programs for the purpose of maintaining an accurate blockchain ledger 306.

Computing system 300 references or includes records or data for users, participants, and digital asset identifiers that are used to represent title records on the blockchain ledger 306 and blockchain transactions. Participants are identifiable entities that can be assigned ownership of a title record that is also tracked by the system. Users, such as the blockchain ledger manager, can be uniquely identifiable entities that have permissions to view, update, and/or control information within the system. In certain instances, a user and participant may be the same or different. For example, in the case of a company, the company may have multiple authorized users that interact with the system on behalf of the company.

In various embodiments, computing system 300 can include computer processor (processor) 328 that executes or runs the server application programming interface (API) 332 and user interface 334. Computing system 300 interfaces via the Internet 336 with blockchain 338, third party applications 340, and user device 342. The processor 328 also runs blockchain manager services 314. Blockchain manager services 314 may include functionality to both send and receive blockchain ledger 306 related transactions and events. For example, a transaction may be submitted to the blockchain ledger 314 for validation. In addition, a validated transaction may be detected or received at the computing system 300 via blockchain manager services 314.

As shown in FIG. 3, computing system 300, using the blockchain manager services 314, operates the blockchain ledger 306 as a platform in which asset transaction records—known as "blocks"—are linked via cryptographic hash functions in a distributed, immutable ledger of interconnected blocks. Each block in the chain includes one or more digital asset transactions accompanied by corroboration information representing a validity of each transaction. The architecture of the computing system 300 allows for identity verification and authentication of transacted assets while preventing duplication of a cryptography-protected ("cryptographic") digital asset registered to the platform.

The blockchain ledger 306 may include a growing list of records in the form of data blocks. Each block is linked to a previous block immediately before it in the blockchain ledger 306 by including the cryptographic hash of the previous block. Each block may include a timestamp, a cryptographic hash of a previous block, and data of the present block, which may be one or more transactions related to the intangible asset or tangible asset of the real property.

After the records have been received and registered in the blockchain ledger 306, in one aspect, the computing system 300 may use the record to record proof of ownership or purchase of an asset, such as a transfer of the real property between one participant and the next. The transfer of the real property may be stipulated according to the terms of the transferring covenant of the contract, such as a smart contract. Thus, the blockchain ledger 306 may operate according to terms of the smart contract to facilitate, verify, or enforce the negotiation or performance of the contract. The user, such as the blockchain ledger manager, may program agreed terms into the smart contract and the smart contract may be automatically executed by the blockchain manager services 314 to perform a transaction. The smart contract may be operational codes that are fully or partially executed without human interaction.

According to the present disclosure, one of the agreed upon terms of the recorded transferring covenant as programmed in the smart contract may state that any subsequent certificates of compliance must be signed with the enforcement agent's cryptographic signature, which is generated using its private key in a public-private key infrastructure.

The blockchain ledger manager can place cryptographically-signed copies of the transaction documents—or of their hashes or both—into the blockchain ledger 306 that any authorized party can examine. Cryptographically signed documents in such a storage system are extremely difficult to alter and cannot be disavowed by the party that signed them. This reduces the risk posed by a stolen private key. An authorized party can compare the document in the repository with the one in its possession to determine whether the latter document is authentic. After the records have been received and registered, the system 300 provides a way to verify the order in which particular records were registered. One exemplary way according to the present disclosure to confirm the history of recordation is to include a cryptographic digest of all previously registered records with the cryptographic hash function. Cryptographic digests create causal one-way relationships between records and thus can be used to verify the order of the transactions without fear of erroneous behavior, because any erroneous confirmation is detectable by a verifier examining the one-way causal hash chain.

Referring to FIG. 3, as a general overview of the blockchain ledger 306, the present disclosure includes a system and method that enables the blockchain ledger manager to add the hash 312 of the cryptographically signed paper title record. When a subsequent transaction is proposed that involves the creation or transfer of an interest in the property recorded on the blockchain ledger, the systems and methods may require the property owner and all parties to the transaction to apply to the blockchain ledger manager to have the transaction approved for recording on the blockchain ledger before the transaction is executed. In the traditional recording system, before a ledger manager, i.e., a recorder of deeds, adds a transaction record to the ledger, the ledger manager only verifies that authentic signatures were intentionally applied to the written agreement presented to it. However, in the systems and method, a property owner can require a ledger manager to provide additional services, such as checking for fraud, before adding a transaction to the ledger.

When the transaction has been approved, the blockchain ledger manager may add the executed transaction and any digital certificates to the property's title on the blockchain ledger. Then, future owners and interest holders of the property may depend upon the recorded transaction and the cryptographically signed certificates to provide enforceable interests.

If a party to the transaction seeks to enforce its blockchain-recorded interest through legal process, the blockchain title, on which every transaction bears the blockchain ledger manager's signature, can be admissible evidence of the property's chain of title and the subject interest's authorized creation and current ownership. The present disclosure differs from the method described in co-pending U.S. patent application Ser. No. 17/494,691, "System and Method with Cryptography for Verifying Consent to a Property Transaction", the contents of which are explicitly incorporated by reference herein. In U.S. patent application Ser. No. 17/494,691, the method functions like software code that forces a traditional ledger to make a call to an off-ledger expert subroutine that processes individual transactions before they are returned to and recorded on the traditional ledger. In contrast, the present disclosure shunts all future transactions onto an entirely different ledger, where they are recorded. In U.S. patent application Ser. No. 17/494,691, the property owner contracts with a personal agent; however, in the present disclosure, the property owner contracts with a blockchain ledger manager who provides the same services to all property owners who register interests on its blockchain ledger.

Blockchain ledger 306 may comprise a plurality of configurable functional blocks or modules. In FIG. 3, after the hash 312 of the paper title record is added to the blockchain ledger 306, in block 316, when the owner of the property and other parties undertake a subsequent transaction 316, this begins an examination and verification process before the subsequent transaction is added into the blockchain ledger 306.

In block 318, the parties submit the transaction agreement and other documents to the blockchain ledger manager. For a transaction to be accepted for recording on the blockchain ledger 306, the parties must have complied with the blockchain ledger's rules. Such rules may include making all transaction documents available for preservation on the blockchain, making affirmative representations, and completing various algorithms or smart contracts.

Smart contracts, or their equivalent, can be used to verify identities, check credentials, flag important contract terms, guard against excessive rates and fees, perform anti-money laundering checks, and satisfy other useful conditions precedent set forth in the blockchain ledger 306 and agreed to by the property owner in its contract with the blockchain ledger manager. Smart contracts or their equivalents can also be used to create and manage fractional ownership interests, to securitize, bundle and syndicate ownership and mortgage interests, and to perform other formerly complex transactions directly on the blockchain ledger. The smart contracts can take several forms, including those powered entirely by machine learning algorithms, artificial intelligence, and other technologies, and those that use human agents, as in the parent application.

Other methods, such as hybrid human-technology systems, can also be employed. For example, human agents can be used on a standalone basis or under a consensus model in which independent agents, such as attorneys, real estate agents, and mortgage brokers, coded or rated transactions for legality, fairness, competitiveness, and other factors. Regardless of the implementation of the present disclosure, certain basic algorithms can be run on the blockchain ledger 306 to provide all property owners with superior protection natively, just as certain operating systems and Internet browsers provide superior cyber protection to users natively.

In block 320, the blockchain ledger manager can apply the blockchain ledger's native protections to determine whether the proposed transaction satisfies the requirements of the blockchain ledger 306.

In block 322, a title agent appointed by the property owner can provide any custom services the property owner has contracted for in any title management plan the property owner may have adopted. The title agent determines whether the proposed transaction satisfies the requirement of the title management plan.

In block 324, if the transaction passes, the title agent issues a certificate of approval that includes the relevant details of the transaction and signs it with its private key.

In some embodiments, one or more of the steps performed by the title agent may be automated. As an example, another computer program, software application, artificial intelligence (AI) or a machine learning algorithm may automatically perform one or more steps described herein regarding the title agent.

In block 326, the parties execute the transaction agreement. The executed agreement is added to the blockchain ledger as an enforceable agreement.

Although this application describes implementing the systems and methods to facilitate the transition from a paper ledger to a blockchain ledger, the systems and methods can be used to transfer management and recordation authority to any ledger that uses any record-keeping technology and for any type of titled property, not just real property.

As illustrated in FIG. 3, in accordance with some example embodiments, system 300 may include various mechanisms, such as one or more processors 328, memories 330, server API 332, and/or user interface 334. Some of these mechanisms can be implemented as modules. As referred to herein, the term "module" includes hardware, software and/or firmware configured to perform one or more particular functions. In this regard, system 300 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 330) that is executable by a suitably configured processing device (e.g., processor 328), or some combination thereof.

Processor 328 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. In an example embodiment, processor 328 is configured to execute instructions stored in memory 330 or otherwise accessible to processor 328. These instructions, when executed by processor 328, may cause system 300 to perform one or more of the functionalities of system 300 as described herein.

The processor 328 also runs blockchain manager services 314. The blockchain manager services 314 may be a software program, engine, and/or a module that is executed by one or more processors interconnected with the blockchain ledger 306. In one embodiment, the blockchain manager services 314 may compile a plurality of transactions into a block, update the blockchain ledger 306 to include a block, route transaction data to one or more smart contracts, and/or automatically enforce one or more smart contracts associated with the real property.

Memory 330 may comprise a single memory or may comprise a plurality of memory components. The plurality of memory components may be embodied on a single computing device or distributed across a plurality of computing devices. In various embodiments, memory 330 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 330 may comprise one or more databases. Memory 330 may be configured to store information, data, applications, instructions, or the like for enabling system 300 to carry out various functions in accordance with example embodiments of the present disclosure.

According to certain aspects, the blockchain ledger manager may interact with the blockchain manager services 314 to control aspects of the blockchain ledger 306 and/or set control parameters associated with the blockchain manager services 314. In one aspect, the plurality of smart contracts associated with the blockchain ledger 306 and the real property may be stored in a smart contracts database. In some embodiments, the smart contract database may be maintained within the blockchain ledger 306.

Server API 332 is an application programming interface that allows machine readable data retrieval and interaction with computing system 300 by external computing sources. Such interaction may be performed via web services or a messaging-based protocol that allows an administrator on a computing device (e.g., a mobile device, a PC, a tablet, etc.) to interface with computing system 300. For example, server API 332 may provide a data stream that indicates when transactions have been submitted to the blockchain, when they have been validated, etc. In certain examples, server API 332 may be used to modify, add, or delete, information regarding assets, transactions, users, or participants.

User interface 334 allows a user, via user device 342, to view, update, and/or control the digital ledger through pre-programmed actions. Users can view the blockchain ledger 306 (as an example of a digital ledger), which represents ownership records for assets defined in asset storage database and interact with the data contained therein through a set of pre-programmed actions. A fully auditable record of every interaction with the ledger may be created and stored for subsequent review. In certain examples, the user interface 334 may be in the form of a web page or dedicated client application.

According to certain aspects, one or more user devices 342 may access data stored at the blockchain ledger 306 via user interface 334, such as by using the real property identification information, such as the property address or legal description of the property, to access the data. The user interface 216 may be used, for example, to view data maintained within the blockchain ledger 306 associated with the real property, to view the status of one or more smart contracts associated with the real property and/or the blockchain ledger 306, compile statistics regarding data maintained in the distributed ledger, and so on.

In some embodiments, user device 342 may function as an input/output module that may be in communication with processor 328 to receive an indication of a user input and/or to provide an audible, visual, mechanical, or other output to a user. As such, the input/output module may include support, for example, for a keyboard, a mouse, a joystick, a display, a touch screen display, a microphone, a speaker, an RFID reader, a barcode reader, a biometric scanner, and/or other input/output mechanisms.

Additionally, or alternatively, one or more third-party applications 340 may interact with the blockchain ledger 306 via a server application program interface (API) 332 of computing system 300. The third-party applications 340 may be associated with one or more entities associated with real property. For example, the third-party applications 340 may include an application to generate various transactions identified by the real property, such as update title status, update ownership information, update lien and lienholder information, and so on. It should be appreciated that although FIG. 3 depicts the third-party applications 340 as separate from the blockchain ledger 306, in some embodiments a portion of the third-party applications 340 may be stored locally at the blockchain ledger 306.

The blockchain 338 may provide secure data provenance, immutability, protection from fraudulent transactions, and distributed record keeping (e.g., different entities may have nodes that are part of the distributed system that maintains the blockchain).

The blockchain 338 can be maintained, stored, and updated, by multiple different computer nodes that each operate to thereby validate transactions submitted to the blockchain 338. Generally, only one of the nodes needs to "receive" a transaction that has been submitted from a client. Once one node receives a transaction it may propagate the transaction to other nodes within the distributed computer system that provides the blockchain 338. In certain examples, different entities may control different ones of the computer nodes that are responsible for maintaining the blockchain.

In certain example embodiments, the blockchain 338 may be a private blockchain implementation (e.g., where only authorized parties are allowed to read and/or write to the blockchain). In certain example embodiments, the blockchain 338 may include nodes used for issuing assets (resources) and nodes that are used for transacting or moving assets/resources between participant identifiers of the blockchain 338.

Each node may hold one or more private keys and be responsible for creating new assets associated with a specific asset type. In certain examples, each node has one private key used for creating and/or digitally signing assets that are to be created by that node (e.g., multiple asset types may be digitally signed or created with the same key). In other examples, each asset has its own unique private key. In certain examples, there is one node per asset type and the nodes on the blockchain may be virtual machines (e.g., such that multiple virtual machines may be executed on one computer system).

Another type of node that is part of or interacts with the blockchain 338 may be a manager or transacting node that is used to move assets from one participant to another participant in the transaction. This type of transaction is generated by a manager or transacting node. This transaction is then digitally signed by a private key held by the manager node. In certain examples, each manager node has a corresponding private key that is used to digitally sign such transactions (e.g., between participants).

The exemplary environment 302 may include additional, fewer, or alternate equipment or components, including those discussed elsewhere herein. Further, in some embodiments, the actions described as being performed by the blockchain ledger 306 may additionally or alternatively be performed at one or more of the input devices, or third-party remote servers or computing devices.

A communications module may be embodied as any device or means embodied in circuitry, hardware, a computer program product comprising computer readable program instructions stored on a computer readable medium (e.g., memory 330) and executed by a processing device (e.g., processor 328), or a combination thereof that is configured to receive and/or transmit data from/to another device. In this regard, the communications module may be in communication with processor 328, such as via a bus. Communications module may include, for example, an antenna, a transmitter, a receiver, a transceiver, network interface card and/or supporting hardware and/or firmware/ software for enabling communications with another computing device.

In some embodiments, non-transitory computer readable storage media can be configured to store firmware, one or more application programs, and/or other software, which include instructions and other computer-readable program code portions that can be executed to control each processor (e.g., processor 328, engine and/or a module of the engine) of the system 300 to implement various operations. As such, a series of computer-readable program code portions are embodied in one or more computer program products and can be used, with a computing device, server, and/or other programmable apparatus, to produce machine-implemented processes.

In various embodiments, the systems and methods contemplates the present teaching in use with non-fungible tokens (NFTs). Some aspects of this invention are directed to digital asset ownership. The digital asset can be recorded as a non-fungible token (NFT) in a blockchain. The present disclosure adds protective schemes to the blockchain which prevent future transfer of the NFT when the protective scheme's requirements have not been met.

What is claimed is:

1. A method utilizing one or more processors and one or more memories, the method comprising: receiving at the one or more processors data representative of a property title from a traditional government ledger, wherein the data representative of the property title is processed with a hash function to obtain a hash value; creating, using the one or more processors, a blockchain transaction by using the hash value of the data representative of the property title transferred from the traditional government ledger to a legally enforceable blockchain ledger; executing a smart contract in the blockchain transaction to define one or more terms of transferring the data representative of the property title to the legally enforceable blockchain ledger; storing the smart contract in the blockchain transaction on the legally enforceable blockchain ledger; in response to receiving the data from the traditional government ledger, (i) establishing an interface between the traditional government ledger and the legally enforceable blockchain ledger using a computing system; (ii) establishing a legal and cryptographic relationship between the traditional government ledger and the legally enforceable blockchain ledger, wherein the hash value of the data representative of the property title includes a cryptographically signed recorded covenant added to the traditional government ledger that shunts and redirects, using the interface, subsequent traditional government ledger transactions from the traditional government ledger to the legally enforceable blockchain ledger and stipulates that the subsequent traditional government ledger transactions must be signed with a blockchain ledger cryptographic signature; and generating, by the one or more processors, a chain of title between the traditional government ledger and the legally enforceable blockchain ledger to verify enforceability of a subsequent blockchain transaction on the legally enforceable blockchain ledger, thereby automatically resolving conflicting interests of real estate transactions on the legally enforceable blockchain ledger by tracing the chain of title cryptographically back to the traditional government ledger; wherein the real estate transactions include, at least, ownership transfers, liens, covenants, bona fide purchaser, holder in due course, fractional ownership, and securitization of mortgage interests; wherein the traditional government ledger includes a registry of records maintained by a government entity; and wherein the legally enforceable blockchain ledger includes an automated enforcement agent configured to provide customizable services to verify compliance of the subsequent blockchain transaction with the one or more terms before adding the subsequent blockchain transaction on the legally enforceable blockchain ledger.

2. The method according to claim 1, wherein the blockchain ledger cryptographic signature is a blockchain ledger manager cryptographic signature generated by a private key.

3. The method according to claim 2, further comprising:
processing the property title with the hash function by signing the hash value with the private key of the blockchain ledger manager; and
storing the signed hash value on the legally enforceable blockchain ledger.

4. The method according to claim 3, further comprising:
initiating an examination and verification process before adding the subsequent blockchain transaction to the legally enforceable blockchain ledger to determine whether the subsequent blockchain transaction meets requirements of the legally enforceable blockchain ledger.

5. The method according to claim 4, further comprising:
issuing a certificate of approval when the subsequent blockchain transaction meets the requirement of the legally enforceable blockchain ledger, wherein the certificate of approval includes details of the subsequent blockchain transaction; and
signing the certificate of approval with a private key of an issuer of the certificate of approval.

6. The method according to claim 5, wherein the issuer of the certificate of approval is a representative appointed as a title agent by a property owner of the property title.

7. The method according to claim 5, wherein the certificate of approval is issued via an automated process that approves the subsequent blockchain transaction.

8. The method according to claim 5, further comprising:
storing the subsequent blockchain transaction to the legally enforceable blockchain ledger based on the issued certificate of approval.

9. A system, comprising: a memory operable to store a blockchain; and a processor operably coupled to the memory, configured to: receive data representative of a property title from a traditional government ledger, wherein the data representative of the property title is processed with a hash function to obtain a hash value; create, using the processor, a blockchain transaction by using the hash value of the data representative of the property title transferred from the traditional government ledger to a legally enforceable blockchain ledger; execute a smart contract in the blockchain transaction to define one or more terms of transferring the data representative of the property title to the legally enforceable blockchain ledger; store the smart contract in the blockchain transaction on the legally enforceable blockchain ledger, wherein the legally enforceable blockchain ledger comprising a plurality of blockchain transactions; in response to receiving the data from the traditional government ledger, (i) establish an interface between the traditional government ledger and the legally enforceable blockchain ledger using a computing system; and (ii) establish a legal and cryptographic relationship between the traditional government ledger and the legally enforceable blockchain ledger, wherein the hash value of the data representative of the property title includes a cryptographically signed recorded covenant added to the traditional government ledger that shunts and redirects, using the interface, subsequent traditional government ledger transactions from the traditional government ledger to the legally enforceable blockchain ledger and stipulates that the subsequent traditional government ledger transactions must be signed with a blockchain ledger cryptographic signature; and generate, by the one or more processors, a chain of title between the traditional government ledger and the legally enforceable blockchain ledger to verify enforceability of a subsequent blockchain transaction on the legally enforceable blockchain ledger, thereby automatically resolving conflicting interests of real estate transactions on the legally enforceable blockchain ledger by tracing the chain of title cryptographically back to the traditional government ledger; wherein the real estate transactions include, at least, ownership transfers, liens, covenants, bona fide purchaser, holder in due course, fractional ownership, and securitization of mortgage interests; wherein the traditional government ledger includes a registry of records maintained by a government entity; and wherein the legally enforceable blockchain ledger includes an automated enforcement agent configured to provide customizable services to verify compliance of the subsequent blockchain transaction with the one or more terms before adding the subsequent blockchain transaction on the legally enforceable blockchain ledger.

10. The system according to claim 9, wherein the blockchain ledger cryptographic signature is a blockchain ledger manager cryptographic signature generated by a private key.

11. The system according to claim 10, wherein the processor is further configured to:
process the property title with the hash function by signing the hash value with the private key of the blockchain ledger manager; and
store the signed hash value to the legally enforceable blockchain ledger.

12. The system according to claim 11, wherein the processor is further configured to:
initiate an examination and verification process before adding the subsequent blockchain transaction to the legally enforceable blockchain ledger to determine whether the subsequent blockchain transaction meets requirements of the legally enforceable blockchain ledger.

13. The system according to claim 12, wherein the processor is further configured to:
issue a certificate of approval when the subsequent blockchain transaction meets the requirement of the legally enforceable blockchain ledger, wherein the certificate of approval includes details of the subsequent blockchain transaction; and sign the certificate of approval with a private key of an issuer of the certificate of approval.

14. The system according to claim 13, wherein the issuer of the certificate of approval is a representative appointed as a title agent by a property owner of the property title.

15. The system according to claim 13, wherein the certificate of approval is issued via an automated process that approves the subsequent blockchain transaction.

16. The system according to claim 13, wherein the processor is further configured to:
    store the subsequent blockchain transaction to the legally enforceable blockchain ledger based on the issued certificate of approval.

17. A non-transitory computer readable medium configured to store instructions for implementing to cause a processor to perform operations comprising: receiving at the processor data representative of a property title from a traditional government ledger, wherein the data representative of the property title is processed with a hash function to obtain a hash value; creating, using the processor, a blockchain transaction by using the hash value of the data representative of the property title transferred from the traditional government ledger to a legally enforceable blockchain ledger; executing a smart contract in the blockchain transaction to define one or more terms of transferring the data representative of the property title to the legally enforceable blockchain ledger; storing the smart contract in the blockchain transaction on the legally enforceable blockchain ledger; in response to receiving the data from the traditional government ledger, (i) establishing an interface between the traditional government ledger and the legally enforceable blockchain ledger using a computing system; and (ii) establishing a legal and cryptographic relationship between the traditional government ledger and the legally enforceable blockchain ledger, wherein the hash value of the data representative of the property title includes a cryptographically signed recorded covenant added to the traditional government ledger that shunts and redirects, using the interface, subsequent traditional government ledger transactions from the traditional government ledger to the legally enforceable blockchain ledger and stipulates that the subsequent traditional government ledger transactions must be signed with a blockchain ledger cryptographic signature; and generating, by the one or more processors, a chain of title between the traditional government ledger and the legally enforceable blockchain ledger to verify enforceability of a subsequent blockchain transaction on the legally enforceable blockchain ledger, thereby automatically resolving conflicting interests of real estate transactions on the legally enforceable blockchain ledger by tracing the chain of title cryptographically back to the traditional government ledger; wherein the real estate transactions include, at least, ownership transfers, liens, covenants, bona fide purchaser, holder in due course, fractional ownership, and securitization of mortgage interests; wherein the traditional government ledger includes a registry of records maintained by a government entity; and wherein the legally enforceable blockchain ledger includes an automated enforcement agent configured to provide customizable services to verify compliance of the subsequent blockchain transaction with the one or more terms before adding the subsequent blockchain transaction on the legally enforceable blockchain ledger.

18. The non-transitory computer readable medium according to claim 17, wherein the blockchain ledger cryptographic signature is a blockchain ledger manager cryptographic signature generated by a private key.

19. The non-transitory computer readable medium according to claim 18, wherein the operations further comprise:
    processing the property title with the hash function by signing the hash value with the private key of the blockchain ledger manager; and
    storing the signed hash value to the legally enforceable blockchain ledger.

20. The non-transitory computer readable medium according to claim 19, wherein the operations further comprise:
    initiating an examination and verification process before adding the subsequent blockchain transaction to the legally enforceable blockchain ledger to determine whether the subsequent blockchain transaction meets requirements of the legally enforceable blockchain ledger.

* * * * *